United States Patent [19]
Ohmura

[11] 4,261,129
[45] Apr. 14, 1981

[54] GUIDE PROTECTOR FOR A TELESCOPIC FISHING ROD

[75] Inventor: Ryuichi Ohmura, Shizuoka, Japan

[73] Assignee: Fuji Kogyo Co., Ltd., Shizuoka, Japan

[21] Appl. No.: 94,372

[22] Filed: Nov. 15, 1979

[51] Int. Cl.³ .............................................. A01K 97/08
[52] U.S. Cl. ..................... 43/25; 150/52 R; 43/26
[58] Field of Search ............ 43/18 R, 24, 25, 26; 7/165, 167; 30/151, 286, 296 A; 81/177 E; 150/52 R; 206/315 R

[56] References Cited

U.S. PATENT DOCUMENTS

| 1,593,935 | 7/1926 | Gerick et al. | 30/286 |
| 3,618,253 | 11/1971 | Edwards et al. | 43/26 |
| 3,624,948 | 12/1971 | Baker | 43/26 |
| 3,830,006 | 8/1974 | Garbolino | 43/25 X |
| 4,216,604 | 8/1980 | Starke | 43/26 X |

FOREIGN PATENT DOCUMENTS

| 6509 | of 1887 | United Kingdom | 43/18 R |
| 381909 | 10/1932 | United Kingdom | 43/18 R |

*Primary Examiner*—Nicholas P. Godici
*Assistant Examiner*—Robert P. Olszewski
*Attorney, Agent, or Firm*—Cantor and Singer

[57] ABSTRACT

Disclosed is a protector for guides of a telescopic rod comprises a resilient cylindrical member with its one end being closed, a hook member provided at its closed end and an opening notched longitudinally along the cylindrical member. The hook member so designed to serves as a hanger of telescopic fishing rods for display and to serve as a shock absorber during transportation.

2 Claims, 4 Drawing Figures

GUIDE PROTECTOR FOR A TELESCOPIC FISHING ROD

BACKGROUND OF THE INVENTION

The present invention relates to a protector of telescopic rods and more particularly protects guides on a telescopic rod.

SUMMARY OF THE INVENTION

In prior arts, a protector often struck hard objects and the protector itself damaged to such an extent, that it is not to be no longer used.

The present invention has been accomplished to obviate this drawback by adding a shock absorbing member and at the same time, utilizes it as a hanger for display or storage of fishing rods in a fishing store.

BRIEF DESCRIPTION OF THE DRAWINGS

The present invention will completely be explained with reference to the accompany drawings wherein.

DETAIL DESCRIPTION OF A PREFERRED EMBODIMENT

Figure 1:
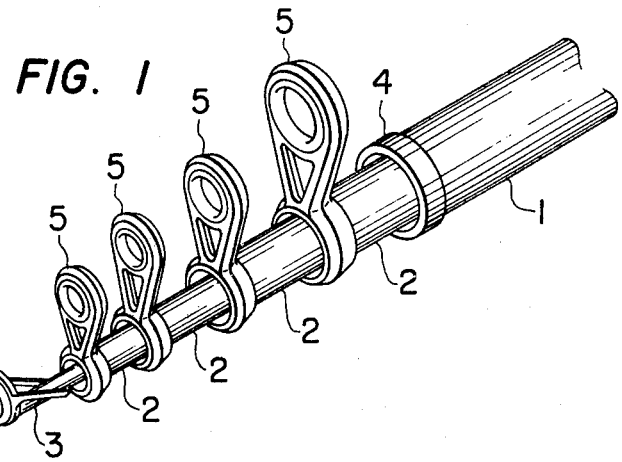
FIG. 1 is isometric drawing of critical portions of telescopic fishing rod.

Referring to the FIG. 1, there is shown a critical portions of telescopic fishing rod in telescoped state, which comprises a butt section 1, intermediate section 2, tip section 3, ferrule 4, line guide 5, and tip top guide 6. It will be understood that the ferrule 4 is normally fitted on an end of the butt section 1 for reinforcement.

Figure 2:
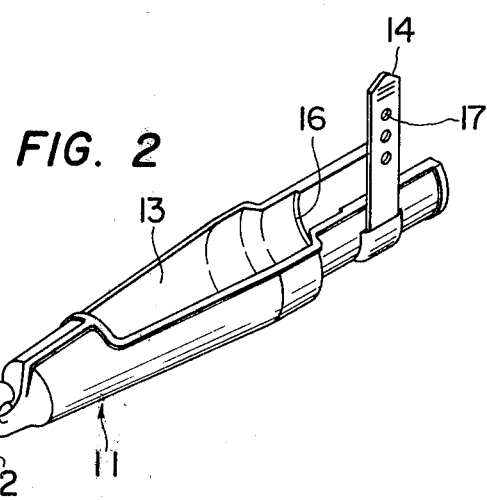
FIG. 2 is isometric drawing of one embodiment of the present invention.

Referring to the FIG. 2, there is illustrated one embodiment which comprises a cylindrical member 11 with its one end being closed and on its closed end a hook member 12 being formed. Those member are integrally formed by synthetic resin having suitable elasticity. The hook member may takes various forms such as annular, oval, providing with the function shock absorbing and hanging.

Referrence numeral 13 is an opening notched longitudinally along the cylindrical member 11 from which the line guides are permitted to project.

Figure 3:
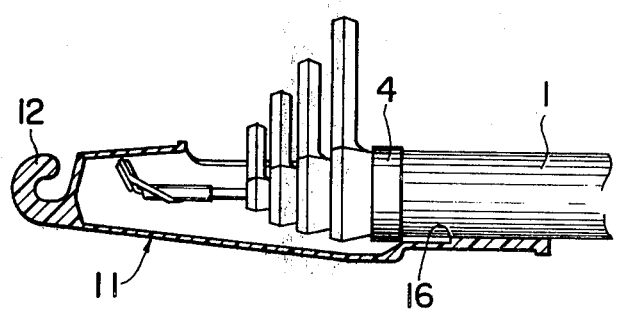
FIG. 3 is a longitudinal section of FIG. 2 which is mounted on a critical portion of telescopic fishing rod.
Figure 4:
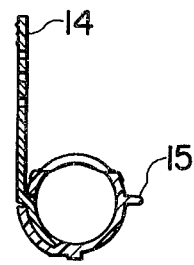
FIG. 4 is a lateral section of a rod fastening members.

In FIG. 3, reference numeral 14 is a rubber band for fastening this cylindrical member 11 to the butt section of a telescopic rod. Rubber band 14 is fixed on a side of a wall of the cylindrical member 11, and on opposite side wall, across the opening, projection 15 is formed to be in engagement with bores 17 formed on rubber band 14.

A stepped portion 16 formed on inner wall of the cylindrical member 11 is designed to be in engagement with the ferrule 4 preventing the fishing rod from slipping out.

As described above, the hook member is provided on a protector, thus made possible to hang the telescopic rod for display or storage at the fishing store. At the same time this hook member serves as a shock absorber during transportation of the telescopic rod.

What is claimed is:

1. A protector for the guides of telescopic rod comprising a resilient cylindrical member with one end being closed, a hook member provided at said closed end, an opening notched longitudinally along the cylindrical member, a rubber band having a plurality of bores fixed on a side wall of said cylindrical member and a fastening projection for engagement with the bores formed on an opposite side wall of the cylindrical member.

2. A protector for the guides of telescopic rods as in claim 1, in which a stepped portion is provided on an inner periphery of the end opposite said closed end.

* * * * *